(12) United States Patent
Westerman et al.

(10) Patent No.: US 9,013,437 B2
(45) Date of Patent: Apr. 21, 2015

(54) NEGATIVE PIXEL COMPENSATION

(71) Applicant: Apple Inc., Cupertino, CA (US)

(72) Inventors: Wayne Carl Westerman, Burlingame, CA (US); Sean Erik O'Connor, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/260,062

(22) Filed: Apr. 23, 2014

(65) Prior Publication Data

US 2014/0232673 A1 Aug. 21, 2014

Related U.S. Application Data

(62) Division of application No. 12/571,061, filed on Sep. 30, 2009, now Pat. No. 8,749,512.

(51) Int. Cl.
*G06F 3/041* (2006.01)
*G06F 3/044* (2006.01)

(52) U.S. Cl.
CPC .............. *G06F 3/041* (2013.01); *G06F 3/0418* (2013.01); *G06F 3/044* (2013.01)

(58) Field of Classification Search
CPC ........ G06F 3/041; G06F 3/0418; G06F 3/044
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |

(Continued)

FOREIGN PATENT DOCUMENTS

| EP | 1 335 318 A2 | 8/2003 |
|---|---|---|
| EP | 1 335 318 A3 | 8/2003 |

(Continued)

OTHER PUBLICATIONS

Final Office Action mailed Oct. 15, 2013, for U.S. Appl. No. 12/571,061, filed Sep. 30, 2012, six pages.

(Continued)

*Primary Examiner* — Latanya Bibbins
(74) *Attorney, Agent, or Firm* — Morrison & Foerster LLP

(57) ABSTRACT

Negative pixel compensation in a touch sensor panel is disclosed. The panel can compensate for a negative pixel effect in touch signal outputs due to poor grounding of an object touching the panel. To do so, the panel can reconstruct a captured touch image to remove negative pixel values indicative of the negative pixel effect and compute a composite image from the captured image and the reconstructed image to replace the captured image. In addition or alternatively, the panel can reconstruct a captured touch image to remove negative pixel values indicative of the negative pixel effect and replace the captured image with the reconstructed image.

10 Claims, 8 Drawing Sheets

(56) References Cited

U.S. PATENT DOCUMENTS

| | | |
|---|---|---|
| 8,479,122 B2 | 7/2013 | Hotelling et al. |
| 8,482,544 B2 | 7/2013 | Land et al. |
| 8,749,512 B2 | 6/2014 | Westerman et al. |
| 2006/0026521 A1 | 2/2006 | Hotelling et al. |
| 2006/0097991 A1 | 5/2006 | Hotelling et al. |
| 2006/0197753 A1 | 9/2006 | Hotelling |
| 2008/0158145 A1 | 7/2008 | Westerman |
| 2008/0158147 A1 | 7/2008 | Westerman et al. |
| 2008/0158185 A1 | 7/2008 | Westerman |
| 2009/0160787 A1 | 6/2009 | Westerman et al. |
| 2009/0174676 A1 | 7/2009 | Westerman |
| 2009/0174688 A1 | 7/2009 | Westerman |
| 2010/0073301 A1 | 3/2010 | Yousefpor et al. |
| 2011/0074725 A1 | 3/2011 | Westerman et al. |

FOREIGN PATENT DOCUMENTS

| | | |
|---|---|---|
| EP | 1 335 318 B1 | 8/2003 |
| EP | 2 077 487 A2 | 7/2009 |
| JP | 2000-163031 A | 6/2000 |
| JP | 2002-342033 A | 11/2002 |
| WO | WO-2011/041192 | 4/2011 |

OTHER PUBLICATIONS

GB Combined Search and Examination Report for GB Application No. 1016359.0, filed Sep. 29, 2010, five pages.

International Search Report mailed Jan. 18, 2011, for PCT Application No. PCT/US2010/049882, filed Sep. 22, 2010, three pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action mailed Sep. 13, 2012, for U.S. Appl. No. 12/571,061, filed Sep. 30, 2009, 10 pages.

Non-Final Office Action mailed Jun. 6, 2013, for U.S. Appl. No. 12/571,061, filed Sep. 30, 2009, 10 pages.

Notice of Allowance mailed Feb. 26, 2014, for U.S. Appl. No. 12/571,061, filed Sep. 30, 2009, five pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI'92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

NEGATIVE PIXEL COMPENSATION

FIELD

This relates generally to touch sensor panels and, more particularly, to compensating for negative pixel effects in touch sensor panels.

BACKGROUND

Many types of input devices are presently available for performing operations in a computing system, such as buttons or keys, mice, trackballs, joysticks, touch sensor panels, touch screens and the like. Touch sensitive devices, such as touch screens, in particular, are becoming increasingly popular because of their ease and versatility of operation as well as their declining price. A touch sensitive device can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch sensitive device can allow a user to perform various functions by touching the touch sensor panel using a finger, stylus or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

When the object touching the touch sensor panel is poorly grounded, touch output values indicative of a touch event can be erroneous or otherwise distorted. The possibility of such erroneous or distorted values can further increase when two or more simultaneous touch events occur at the touch sensor panel.

SUMMARY

This relates to compensating touch signals indicative of a touch at a touch sensor panel for errors that can be caused by poor grounding of a user or other objects touching the panel. One such error can be a negative pixel effect, in which an apparent negative amount of touch can be sensed by the panel during multiple simultaneous touches. In some embodiments, to compensate for this effect, the panel can reconstruct a captured touch image to eliminate negative pixel values and then compute a composite of the captured touch image and the reconstructed touch image to replace the captured image. In other embodiments, to compensate for this effect, the panel can reconstruct a captured touch image to eliminate negative pixel values and then replace the captured image with the reconstructed image. The ability to compensate for a negative pixel effect in a touch sensor panel can advantageously provide faster and more accurate touch detection, as well as power savings, by not having to repeat measurements subject to poor grounding conditions. Additionally, the panel can more robustly adapt to various grounding conditions of a user or other object.

DETAILED DESCRIPTION

Figure 1:
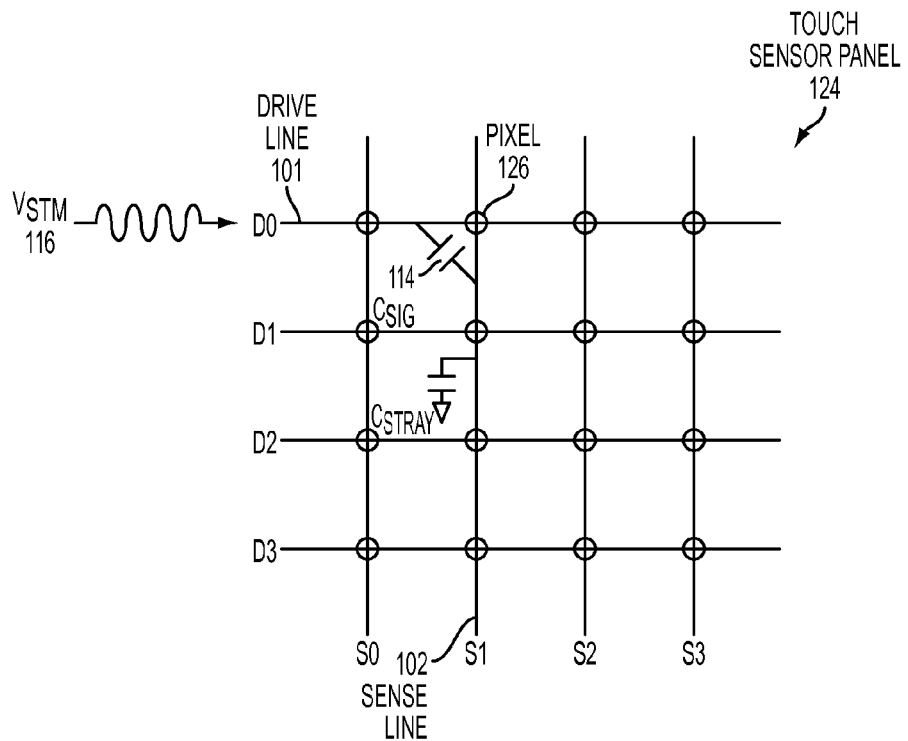
FIG. 1 illustrates an exemplary touch sensor panel in a no-touch condition according to various embodiments.

In the following description of various embodiments, reference is made to the accompanying drawings which form a part hereof, and in which it is shown by way of illustration specific embodiments which can be practiced. It is to be understood that other embodiments can be used and structural changes can be made without departing from the scope of the various embodiments.

This relates to compensating for a negative pixel effect in a touch sensor panel due to poor grounding of a user or other objects touching the panel. In some embodiments, the panel can reconstruct a captured touch image to remove negative pixel values indicative of the negative pixel effect and then compute a composite image of the captured image and the reconstructed image to replace the captured image, thereby compensating for the negative pixel effect. In some embodiments, the panel can reconstruct a captured touch image to remove negative pixel values indicative of the negative pixel effect and then replace the captured image with the reconstructed image, thereby compensating for the negative pixel effect.

The ability to compensate for a negative pixel effect in a touch sensor panel can advantageously provide faster and more accurate touch detection, as well as power savings, by not having to repeat measurements subject to poor grounding conditions. Additionally, the panel can more robustly adapt to various grounding conditions of a user or other object.

The terms "poorly grounded," "ungrounded," "not grounded," "partially grounded," "not well grounded," "improperly grounded," "isolated," and "floating" can be used interchangeably to refer to poor grounding conditions that can exist when an object is not making a low impedance electrical coupling to the ground of the touch sensor panel.

The terms "grounded," "properly grounded," and "well grounded" can be used interchangeably to refer to good grounding conditions that can exist when an object is making a low impedance electrical coupling to the ground of the touch sensor panel.

Although various embodiments can be described and illustrated herein in terms of mutual capacitance multi-touch sensor panels, it should be understood that the various embodiments are not so limited, but can be additionally applicable to other sensors in which single stimulation signals can be used to generate a touch signal and in which multiple simultaneous stimulation signals can be used to generate a composite touch signal. Moreover, although various embodiments described and illustrated herein can be implemented using double-sided ITO (DITO) touch sensor panels, it should be understood that the various embodiments can be also applicable to other touch sensor panels configurations, including opaque touch sensor panels, such as configurations in which the drive and sense lines can be formed on different substrates or on the back of a cover glass, and configurations in which the drive and sense lines can be formed on the same side of a single substrate. Furthermore, although various embodiments can be described and illustrated herein in terms of rows and columns of conductive lines orthogonal to each other, it should be understood that the various embodiments are not so limited, but additionally encompass other geometric configurations, such as concentric and radial lines of a polar-coordinate configuration, diagonal lines of an oblique configuration, non-orthogonal lines, and so on.

FIG. 1 illustrates an exemplary touch sensor panel in a no-touch condition, i.e., where there are presently no touches at the panel, according to various embodiments. In the example of FIG. 1, touch sensor panel 124 can include an array of pixels 126 that can be formed at the crossings of rows of drive lines 101 (D0-D3) and columns of sense lines 102 (S0-S3). Each pixel 126 can have an associated mutual capacitance Csig 114 when the drive line 101 forming the pixel is stimulated with a stimulation signal Vstm 116. Each pixel 126 can also have an associated stray capacitance Cstray when the drive line 101 forming the pixel is not stimulated with a stimulation signal Vstm 116 but is connected to DC. In this example, drive line D0 can be stimulated with stimulation signal 116 (Vstm), forming mutual capacitance Csig 114 at the pixels 126 formed between the drive line D0 and the crossing sense lines S0-S3. One or more drive lines 101 can be stimulated at a time.

Figure 2:
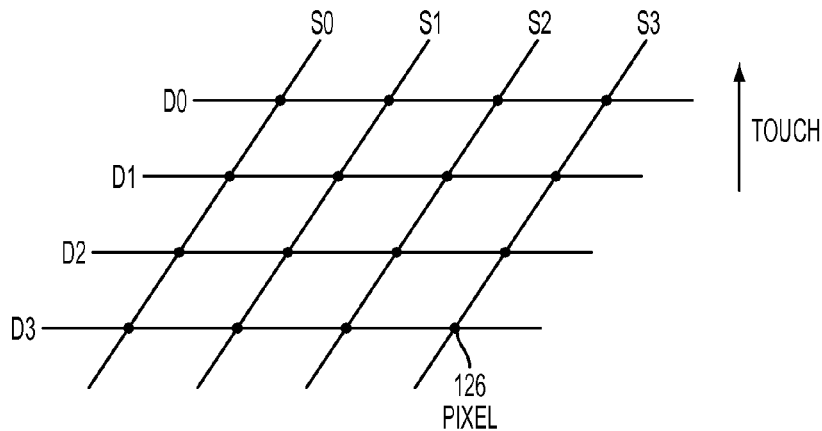
FIG. 2 illustrates an exemplary touch map of a touch sensor panel in a no-touch condition according to various embodiments.

FIG. 2 illustrates an exemplary touch map of a touch sensor panel in a no-touch condition according to various embodiments. In the example of FIG. 2, drive lines D0-D3 of a touch sensor panel can be individually and/or simultaneously stimulated with stimulation signal(s) Vstm. Since there are no fingers (or other objects) touching the pixels 126 formed by the drive lines D0-D3 and the crossing sense lines S0-S3, the fingers cannot block some of the electric field lines formed when the drive lines are stimulated so as to reduce the mutual capacitance Csig by an amount ΔCsig. As such, the touch map can remain substantially flat at the pixels 126 to indicate no touch.

Referring again to FIG. 1, when a grounded user's finger (or other object) touches the panel 124, the finger can cause the capacitance Csig 114 to reduce by an amount ΔCsig at the touch location as previously mentioned. This capacitance change ΔCsig can be caused by current or charge from the electric field lines being shunted through the touching finger to ground. Touch signals representative of the capacitance change ΔCsig can be transmitted by the sense lines 102 to the sense circuitry for processing. The touch signals can indicate the pixel 126 where the touch occurred and the amount of touch that occurred at that pixel location.

Conversely, when an ungrounded user's finger (or other object) touches the panel 124, the current or charge from the electric field lines can be transmitted by the touching finger back into the crossing sense line 102 rather than being shunted to ground. As a result, instead of the capacitance Csig 114 of the pixel at the touch location being reduced by ΔCsig, Csig may only be reduced by (ΔCsig−Cneg), where Cneg can represent a so-called "negative capacitance" resulting from the charge coupled into the crossing sense line due to the finger's poor grounding. The touch signals can still generally indicate the pixel 126 where the touch occurred but with an indication of a lesser amount of touch than actually occurred.

When multiple ungrounded user's fingers (or other objects) touch the panel 124, the lesser amount of touch can be exacerbated to create a so-called "negative pixel effect."

Figure 3:
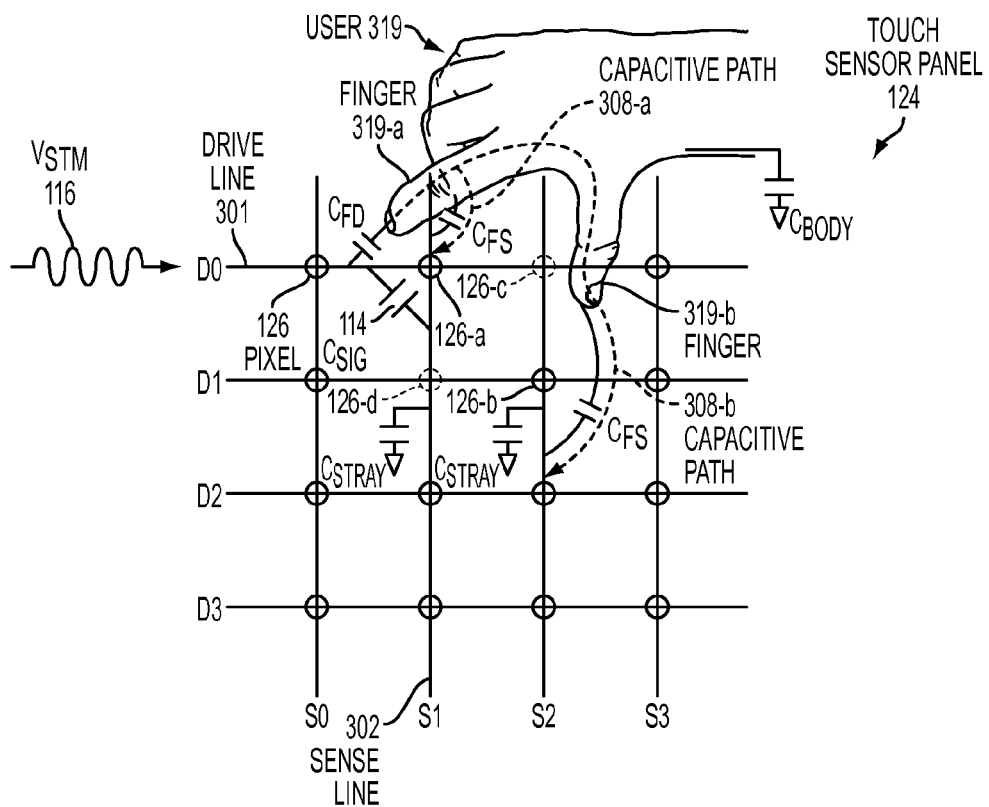
FIG. 3 illustrates an exemplary touch sensor panel having multiple touches from an ungrounded object which can create negative pixel effect according to various embodiments.

FIG. 3 illustrates an exemplary touch sensor panel having multiple touches from an ungrounded user (or other objects) which can create a negative pixel effect according to various embodiments. In the example of FIG. 3, one of drive lines 301 (D0) of touch sensor panel 124 can be stimulated with a stimulation signal 116 (Vstm) to form a mutual capacitance Csig 114 between the stimulated drive line D0 and the crossing sense lines 302 (S0-S3). In this example, user 319 can touch with finger 319-a at pixel 126-a formed by drive line D0 and sense line S1 ("pixel D0,S1") and with finger 319-b at pixel 126-b formed by drive line D1 and sense line S2 ("pixel D1,S2"). Because the user 319 is ungrounded, the user's body capacitance Cbody to ground can vary significantly, e.g., between 10-100 pF in some embodiments. The user's finger 319-a can also form a capacitance Cfd from the stimulated drive line D0 to that finger. When the finger 319-a touches at the touch sensor panel 124, the finger can block some of the electric field lines formed when the drive line D0 is stimulated. But instead of those electric field lines being shunted to ground, a capacitance Cfs from the finger 319-a to the sense line S1 can form, sending some of the electric field charge through capacitive path 308-a from the finger to the sense line S1. As a result, instead of the mutual capacitance Csig at pixel D0,S1 being reduced by ΔCsig, Csig can only be reduced by (ΔCsig−Cneg), resulting from the charge sent into sense line S1 due to the poor grounding of the user, as described previously.

Similarly, a capacitance Cfs from the finger 319-b to the sense line S2 can also form, sending some of the electric field charge through capacitive path 308-b from the finger to the sense line S2. As a result, though drive line D1 is not being stimulated with Vstm while drive line D0 is being stimulated, the finger 319-b at pixel D1,S2 can increase that pixel's capacitance by Cneg (a negative capacitance at the pixel resulting from the charge sent into sense line S2 due to the poor grounding of the user) to a capacitance above that of a no-touch condition to give the appearance of a so-called "negative pixel" or a theoretical negative amount of touch at pixel D1,S2.

Adjacent pixels can also experience this negative pixel effect. The pixel 126-c formed by the drive line D0 and the crossing sense line S2 ("pixel D0,S2") can increase that pixel's capacitance Csig by Cneg, due to the capacitance Cfs introduced by the finger 319-b into the sense line S2. Similarly, the pixel 126-d formed by the drive line D1 and the crossing sense line S1 ("pixel D1,S1") can increase that pixel's capacitance by Cneg to a capacitance above that of no touch, due to the capacitance Cfs introduced by the finger 319-a into the sense line S1.

Similar to the finger 319-a, when drive line D1 is stimulated with Vstm, the finger 319-b can reduce the mutual capacitance Csig by (ΔCsig−Cneg) at pixel D1,S2, where Cneg can be a negative capacitance at the pixel resulting from the electric field charge sent into sense line S2 when drive line D1 is stimulated. In this example, since drive line D0 is not stimulated while drive line D1 is stimulated, the finger 319-a at pixel D0,S1 can increase that pixel's capacitance by Cneg to give the appearance of a negative pixel. Adjacent pixels D1,S2 and D0,S1 can similarly experience the negative pixel effect.

Figure 4:
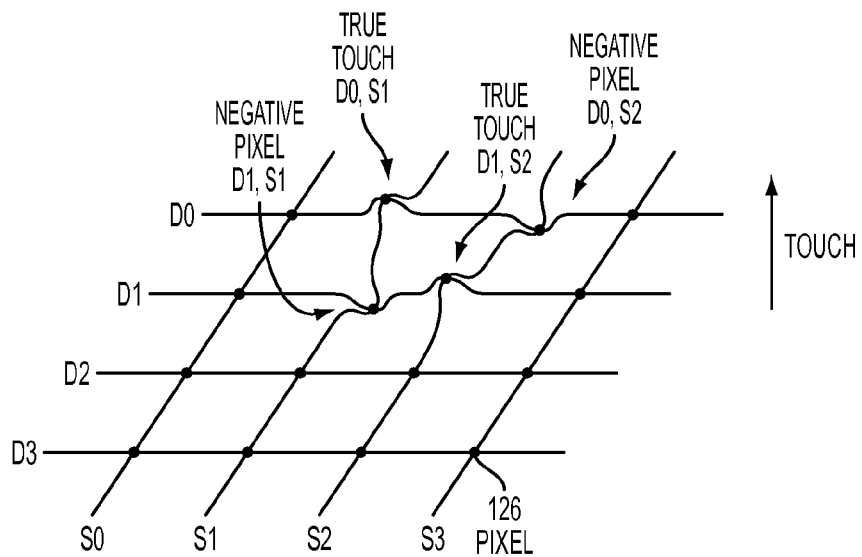
FIG. 4 illustrates an exemplary touch map of a touch sensor panel having multiple touches from an ungrounded object which can create negative pixel effect according to various embodiments.

FIG. 4 illustrates an exemplary touch map of a touch sensor panel having multiple touches from an ungrounded user (or other objects) which can create a negative pixel effect according to various embodiments. In the example of FIG. 4, drive lines D0-D3 of a touch sensor panel can be individually and/or simultaneously stimulated with stimulation signal(s) Vstm. User 319 can touch with finger 319-a at pixel D0,S1 and with finger 319-b at pixel D1,S2, as in FIG. 3. When drive line D0 is stimulated, the finger 319-a at pixel D0,S1 can shunt some of the blocked electric field lines into the sense line S1 instead of into ground, such that the touch map can indicate an attenuated true touch (or positive pixel) at that pixel (symbolically illustrated by a slight peak in FIG. 4). Similarly, when drive line D1 is stimulated, the finger 319-b at pixel D1,S2 can shunt some of the blocked electric field lines into the sense line S2 instead of into ground, such that the touch map can indicate an attenuated true touch (or positive pixel) at that pixel (symbolically illustrated by a slight peak in FIG. 4). Adjacent pixels D1,S1 and D0,S2 can experience a negative pixel effect, as described previously, such that the touch map can indicate a negative touch (or negative pixel) at these pixels (symbolically illustrated by hollows in FIG. 4). The net result of the user being poorly grounded can be that the touch signal of the pixel being touched can be attenuated and the adjacent pixels can have negative touch signals.

The touch map in this example indicates the touches when both drive lines D0 and D1 are stimulated. However, in the case where only drive line D0 is stimulated, the touch map can indicate an attenuated touch of the finger 319-a at pixel D0,S1 and negative touches of various magnitudes of the finger 319-b at pixel D1,S2 and at adjacent no-touch pixels D1,S1 and D0,S2. Conversely, in the case where only drive line D1 is stimulated, the touch map can indicate an attenuated touch of the finger 319-b at pixel D1,S2 and negative touches of various magnitudes of the finger 319-a at pixel D0,S1 and at adjacent no-touch pixels D1,S1 and D0,S2.

Accordingly, detecting the negative pixel effect and compensating the touch signals for the effect can improve touch sensing of the touch sensor panel in poor grounding conditions.

Figure 5:
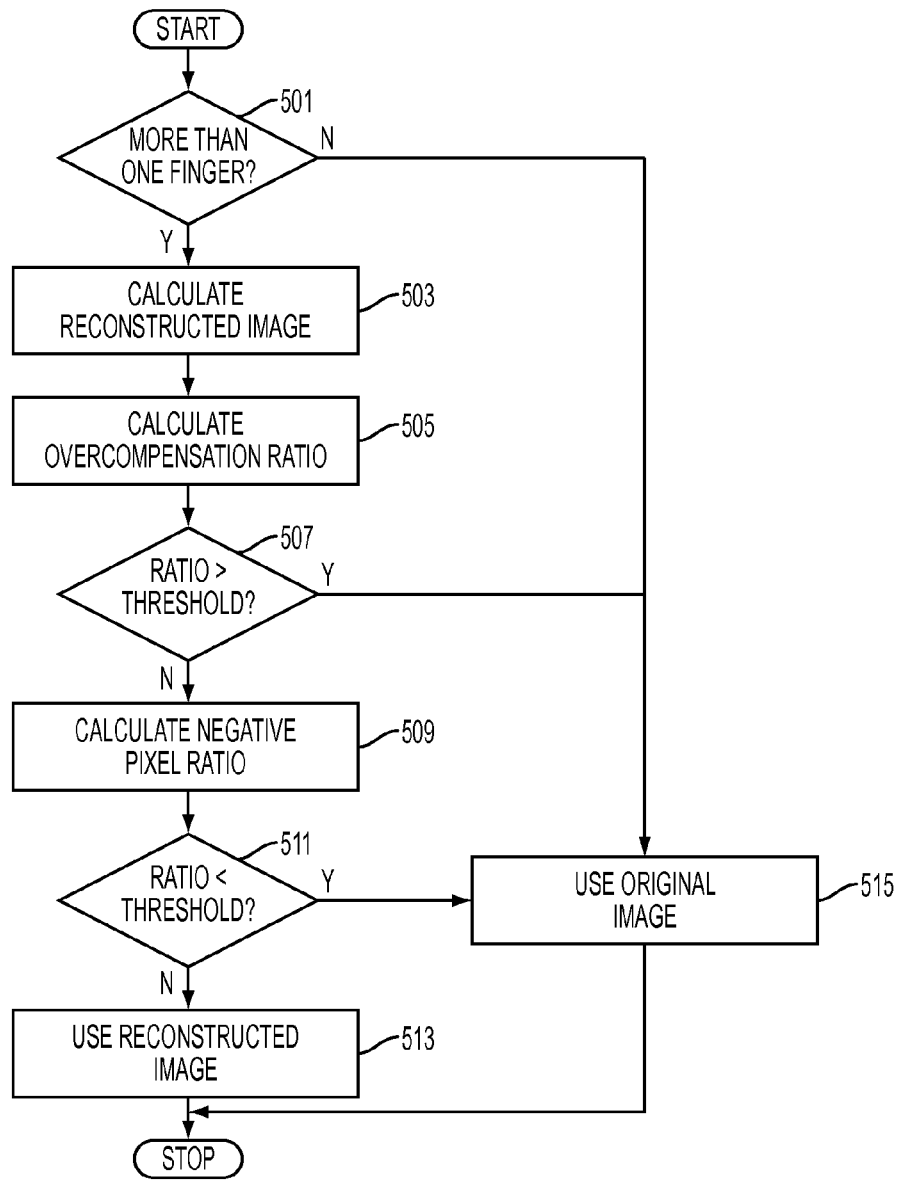
FIG. 5 illustrates an exemplary method for compensating for negative pixel effect according to various embodiments.

FIG. 5 illustrates an exemplary method for compensating for negative pixel effect according to various embodiments. In the example of FIG. 5, a touch can be detected at a touch sensor panel and captured in a touch image. A determination can be made whether more than one finger (or other objects) is touching the panel based on the captured touch image (501). Various metrics can be used to make this determination. For example, a touch magnitude can be measured from the touch image, where the magnitude can be indicative of the number of fingers making the touch at the panel. That is, a certain magnitude range can indicate one finger touching and another magnitude range can indicate more than one finger touching. The touch magnitude can be calculated as the sum of touch image pixel values above a particular threshold, such as a background noise threshold, for example. If more than one finger is touching, the touch sensor panel may be more likely to experience a negative pixel effect for which the touch image can be compensated. Conversely, if one finger is touching, the touch sensor panel may be less likely to experience a negative pixel effect such that touch image compensation can be omitted. Accordingly, if only one finger is touching, the captured touch image can be used for further processing without negative pixel compensation (515). It should be noted that, in some embodiments, one flattened finger touching the touch sensor panel can create a negative pixel effect similar to multiple touching fingers, such that the touch image can be compensated. Therefore, a one-flat-finger touch can be treated as a multi-finger touch.

If more than one finger is touching the touch sensor panel, the captured touch image can be reconstructed without negative pixel values, i.e., as if the negative pixel effect had not occurred (503). Various methods can be used to produce the reconstructed image. For example, in one method, an actual touch signal value ΔCsig,a at a pixel can be reconstructed from a measured touch signal value ΔCsig,m at that pixel as follows, $$\Delta C_{sig,a}(i, j) = \Delta C_{sig,m}(i, j) + R \times \sum_{all\_j} \Delta C_{sig,m}(i, j) \times \sum_{all\_i} \Delta C_{sig,m}(i, j), \quad (1)$$

where R=a negative pixel compensation factor, which can be a function of Cfd, Cfs, and Cbody, thereby representative of a user's grounding condition;

$$\sum_{all\_j} \Delta C_{sig,m}(i, j) =$$

the sum of all measured touch signal outputs along drive line $i$; and $$\sum_{all\_i} \Delta C_{sig,m}(i, j) =$$

the sum of all measured touch signal outputs along sense line $j$.

The negative pixel compensation factor R can be approximated as follows, $$R = b \times \left( \frac{1}{\sum_{all\_i, all\_j} \Delta C_{sig,m}(i, j) + C_{body}} \right), \quad (2)$$

where b=a touch sensor panel design constant, which can be obtained through simulation and/or empirical measurements for a given panel sensing pattern design; and Cbody=a user's nominal body ground capacitance in an ungrounded condition.

In the reconstructed touch image, the negative pixel values from the captured touch image can be attenuated and the true (or positive) touch pixel values from the captured touch image accentuated.

An overcompensation ratio can be calculated for a particular nominal value of Cbody (505). The overcompensation ratio can be an indication of the grounding condition of the user and hence whether the negative pixel effect is likely. For example, a grounded user is less likely to cause the negative pixel effect. The overcompensation ratio can be calculated as the ratio of the sum of the positive touch values in the reconstructed image to the sum of the positive touch values in the original captured touch image. Alternatively, the overcompensation ratio can be calculated as the ratio of the sum of all touch values in the reconstructed image to the sum of all touch values in the original captured touch image. Alternatively, the overcompensation ratio can be calculated as the ratio of a peak touch value in the reconstructed image to a maximum possible touch value in the original captured touch image. A higher overcompensation ratio can indicate little or no negative pixel effect. The higher ratio can be a result of the reconstructed image including unnecessarily compensated pixels such that the intensity and number of positive pixel values increases significantly over the number in the captured image due to the fact that the reconstruction can be performed for a finite value of Cbody rather than an actual value of Cbody at infinity for the grounded condition. Conversely, a lower overcompensation ratio can indicate more negative pixel effect. The lower ratio can be a result of the reconstructed image including properly compensated pixels such that the number of positive pixel values more closely matches the number in the captured image.

Figure 6:
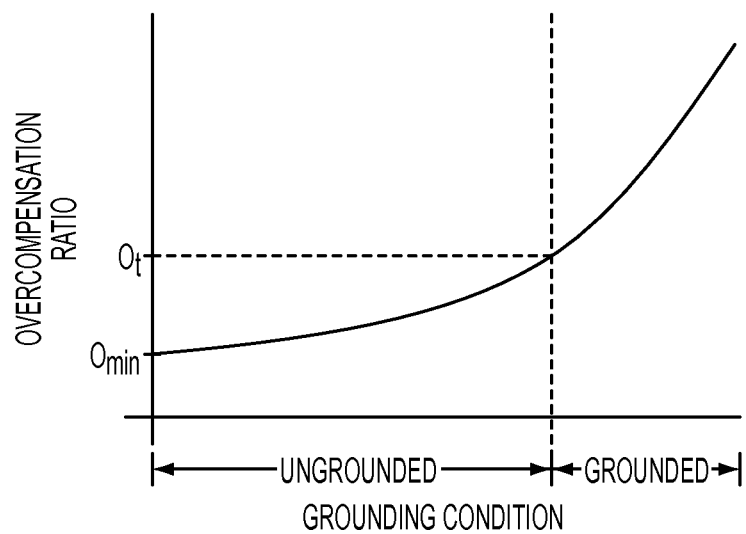
FIG. 6 illustrates an exemplary plot of a grounding condition of an object versus an overcompensation ratio which can be utilized to compensate for negative pixel effect according to various embodiments.

FIG. 6 illustrates an exemplary plot of a grounding condition of an object, e.g., a user, versus an overcompensation ratio. In the example of FIG. 6, an overcompensation ratio above threshold Ot can indicate a grounded user touching the touch sensor panel and, hence, little or no negative pixel effect. In contrast, an overcompensation ratio below threshold Ot can indicate an ungrounded user touching the panel and, hence, more negative pixel effect. In some embodiments, the overcompensation ratio threshold Ot can be determined to be 1.8. In some embodiments, the minimum overcompensation ratio Omin can be determined to be 1.3, indicating an ungrounded user.

Referring again to FIG. 5, a determination can be made whether the calculated overcompensation ratio is above a threshold Ot indicating that the touching user is grounded (507). If so, the captured touch image can be used for further processing without negative pixel compensation (515).

If the calculated overcompensation ratio is below the threshold Ot indicating that the touching user is ungrounded, additional analysis can be performed to confirm the grounding condition. Here, a negative pixel ratio can be calculated (509). The negative pixel ratio can be an indication of the grounding condition of the user and hence whether the negative pixel effect is likely. For example, a grounded user is less likely to cause the negative pixel effect. The negative pixel ratio can be calculated as the ratio of the sum of negative touch values to the sum of positive touch values in the original captured touch image. A higher negative pixel ratio can indicate the negative pixel effect because the number of negative pixels (indicative of the negative pixel effect) can be larger and closer to the number of positive pixels. Conversely, a lower negative pixel ratio can indicate little or no negative pixel effect because the number of negative pixels can be much lower than the number of positive pixels.

Figure 7:
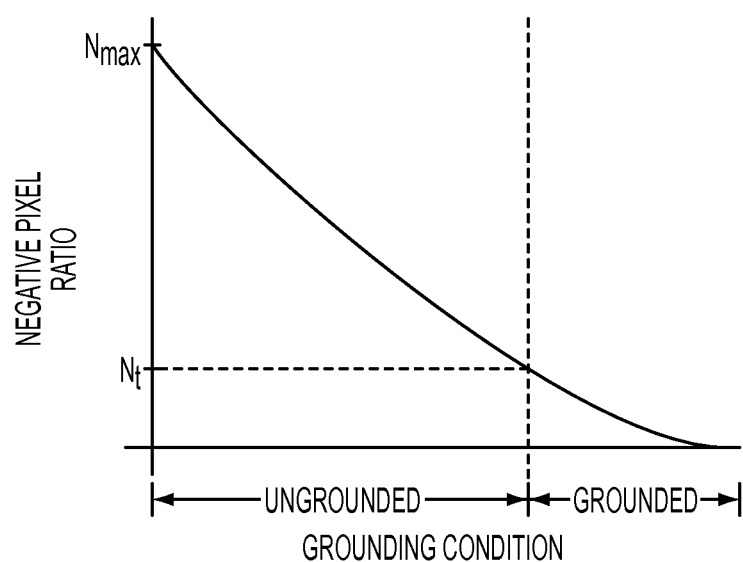
FIG. 7 illustrates an exemplary plot of a grounding condition of an object versus a negative pixel ratio which can be utilized to compensate for negative pixel effect according to various embodiments.

FIG. 7 illustrates an exemplary plot of a grounding condition of an object, e.g., a user, versus a negative pixel ratio. In the example of FIG. 7, a negative pixel ratio below threshold Nt can indicate a grounded user touching the touch sensor panel and, hence, little or no negative pixel effect. In contrast, a negative pixel ratio above threshold Nt can indicate an ungrounded user touching the panel and, hence, more negative pixel effect. In some embodiments, the negative pixel ratio threshold Nt can be determined to be 0.1. In some embodiments, the maximum negative pixel ratio Nmax can be determined to be 0.4, indicating an ungrounded user.

Referring again to FIG. 5, a determination can be made whether the calculated negative pixel ratio is below a threshold Nt indicating that the touching user is grounded (511). If it is determined that the calculated negative pixel ratio is below the threshold, the negative pixel ratio and the overcompensation ratio will have indicated conflicting grounding conditions of the user—the overcompensation ratio having indicated ungrounded and the negative pixel ratio having indicated grounded. Since the negative pixel ratio can generally be more consistent than the overcompensation ratio's ungrounded indication, the negative pixel ratio can be determinative of the user's grounding condition. Accordingly, if the negative pixel ratio indicates that the touching user is grounded, the original captured touch image can be used for further processing without negative pixel compensation (515).

If the negative pixel ratio is above the threshold Nt indicating that the touching user is ungrounded, the reconstructed image can be used in place of the captured touch image for further processing (513).

Figure 8:
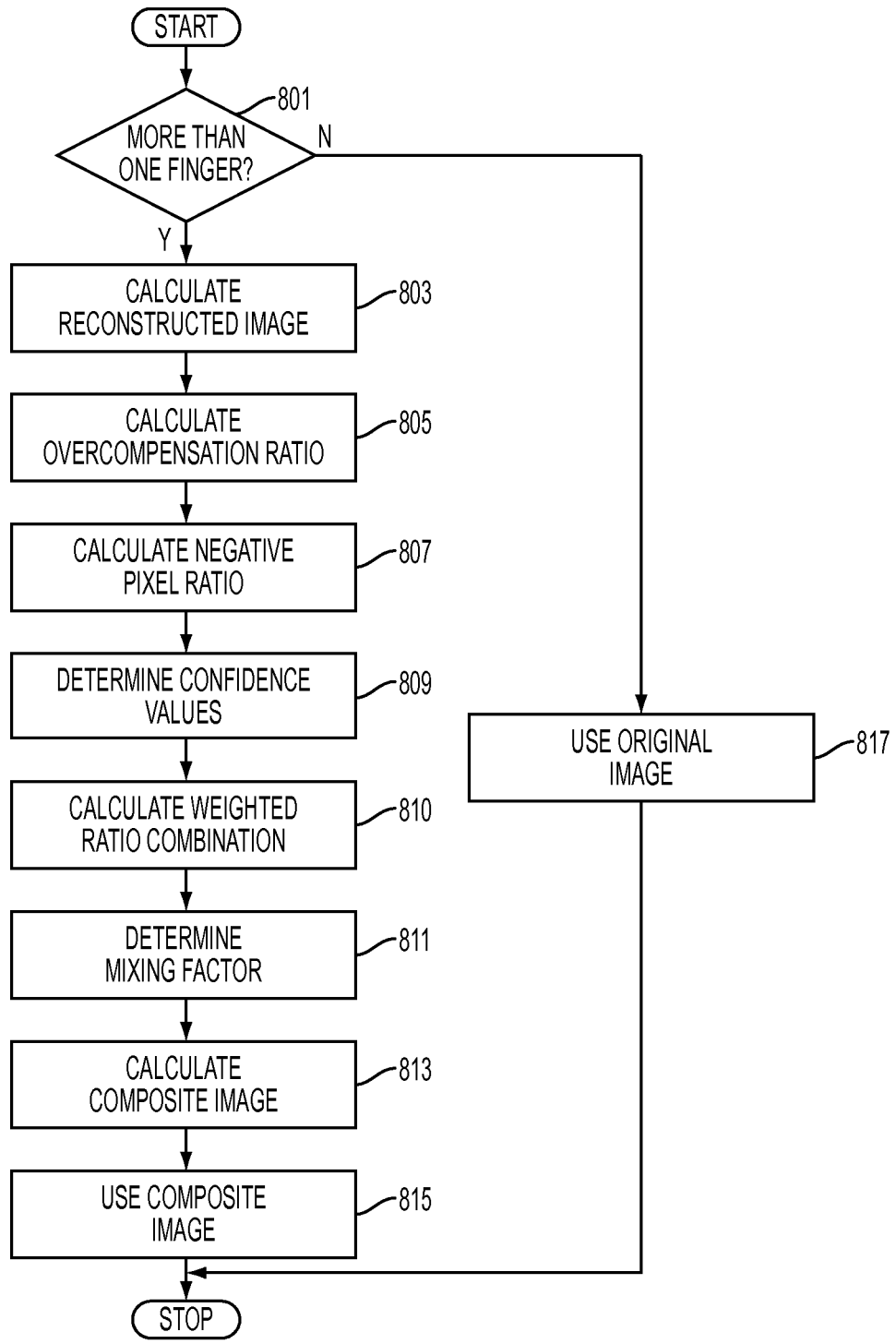
FIG. 8 illustrates another exemplary method for compensating for negative pixel effect according to various embodiments.

FIG. 8 illustrates another exemplary method for compensating for negative pixel effect according to various embodiments. In the example of FIG. 8, a touch can be detected at a touch sensor panel and captured in a touch image. A determination can be made whether more than one finger (or other objects) is touching the panel based on the captured touch image (801). Various metrics can be used to make this determination, such as the touch magnitude previously described. If only one finger is touching, the captured touch image can be used for further processing because negative pixel effect can be less likely (817). If more than one finger is touching, the captured touch image can be reconstructed to reduce the negative pixel effect (803). Various methods can be used to produce the reconstructed image, as previously described. An overcompensation ratio can be calculated (805). The overcompensation ratio can be calculated as previously described. A negative pixel ratio can be calculated (807). The negative pixel ratio can be calculated as previously described. As discussed further below, a one finger touch confidence value can be determined based on the above-mentioned determination of the number of touching fingers, and a negative pixel grounding confidence value can be determined based on the above-mentioned negative pixel ratio.

Figure 9:
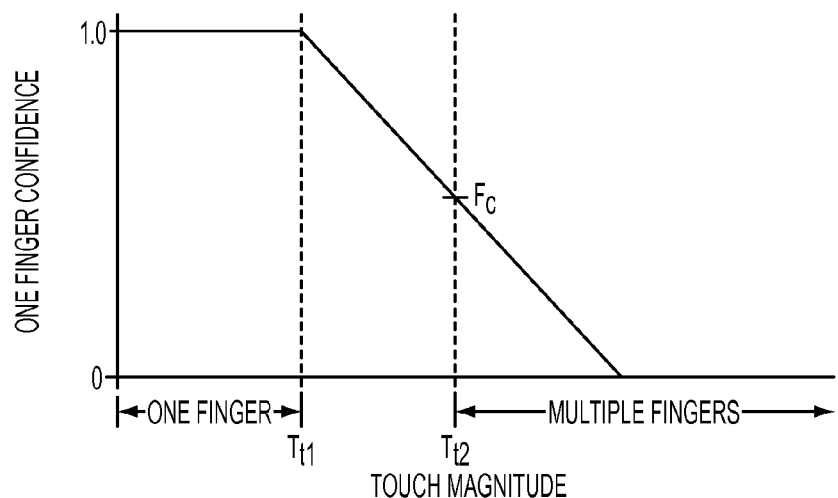
FIG. 9 illustrates an exemplary plot of touch magnitude versus one finger touch confidence which can be utilized to compensate for negative pixel effect according to various embodiments.

FIG. 9 illustrates an exemplary plot of touch magnitude versus one finger touch confidence. In the example of FIG. 9, a touch magnitude less than Tt1 can indicate that one finger is touching a touch sensor panel. A confidence value 1.0 can correspond to the one-finger value, indicating confidence that one finger is touching the panel. A touch magnitude greater than Tt2 can indicate that either more than one finger or one flat finger is touching the panel. A confidence value between 0.0 and Fc can correspond to the multi-finger or flat-finger value, indicating confidence that multiple fingers or a flat finger is touching the panel. A touch magnitude between Tt1 and Tt2 can be indicative of either one finger, multiple fingers, or one flat finger touching the panel. A confidence value between Fc and 1.0 can correspond to the touch magnitude between Tt1 and Tt2, indicating less confidence in knowing the number of fingers touching the panel. In this example, a confidence value nearer 1.0 can be indicative of one touching finger and a confidence value nearer 0.0 can be indicative of more than one touching finger or one flat touching finger.

Figure 10:
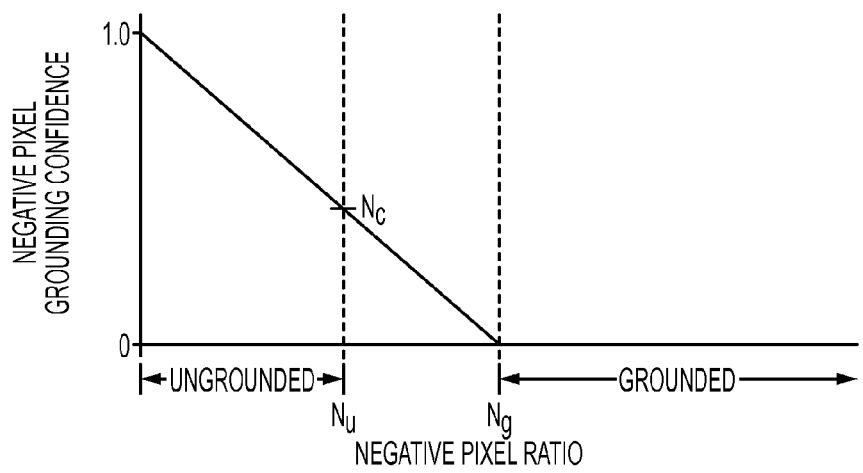
FIG. 10 illustrates an exemplary plot of negative pixel ratio versus negative pixel grounding confidence which can be utilized to compensate for negative pixel effect according to various embodiments.

FIG. 10 illustrates an exemplary plot of negative pixel ratio versus negative pixel grounding confidence. In the example of FIG. 10, a negative pixel ratio less than Nu can indicate that an ungrounded user is touching a touch sensor panel. A confidence value between Nc and 1.0 can correspond to that negative pixel ratio, indicating confidence that the user is ungrounded. A negative pixel ratio greater than Ng can indicate that a grounded user is touching the panel. A confidence value 0.0 can correspond to that negative pixel ratio, indicating confidence that the user is grounded. A negative pixel ratio between Nu and Ng can be indicative of either an ungrounded user or a grounded user. A confidence value between Nc and 0.0 can correspond to the ratio between Nu and Ng, indicating less confidence in knowing the user's grounding condition. In this example, a confidence value nearer 1.0 can be indicative of an ungrounded user and a confidence value nearer 0.0 can be indicative of a grounded user.

Referring again to FIG. 8, the determined number of touching fingers (from 801) can be applied to the plot of FIG. 9 to determine the corresponding one finger touch confidence value (809). The calculated negative pixel ratio (from 807) can be applied to the plot of FIG. 10 to determine the corresponding negative pixel grounding confidence value (809). The determined one finger touch confidence value, the determined negative pixel grounding confidence value, and the calculated overcompensation ratio (from 805) can be added as follows to calculate a weighted ratio combination W (810).

$$W = O + x \times T + y \times N, \quad (3)$$

where O=the calculated overcompensation ratio; T=the determined one finger touch confidence value; N=the determined negative pixel grounding confidence value; x=the one finger weight; and y=the negative pixel weight. In some embodiments, x=1.0 and y=0.5. Because, for some hand positions, positive and negative pixels can cancel, the negative pixel ratio can be lower than expected in an ungrounded condition. In such a case, a weighting factor can be applied to the negative pixel ratio before determining the negative pixel grounding confidence value. In some embodiments, the negative pixel ratio weighting factor can be 0.5. Other formulas for combining the confidence values and/or the overcompensation ratio can also be used to calculate the weighted ratio combination. An image mixing factor can be determined based on the weighted ratio combination (811).

Figure 11:
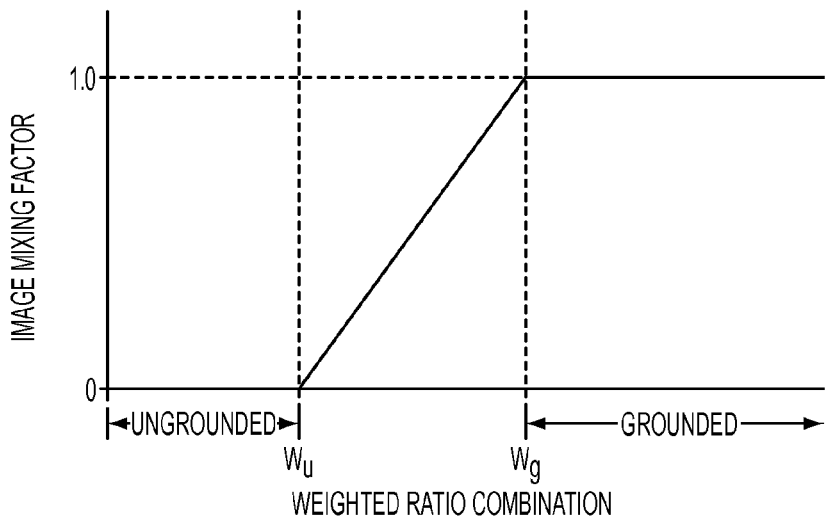
FIG. 11 illustrates an exemplary plot of weighted ratio combination versus image mixing factor which can be utilized to compensate for negative pixel effect according to various embodiments.

FIG. 11 illustrates an exemplary plot of weighted ratio combination versus image mixing factor. In the example of FIG. 11, a weighted ratio combination less than Wu can indicate that an ungrounded user is touching a touch sensor panel. An image mixing factor 0.0 can correspond to that combination value, indicating that negative pixel effect is present and that the original captured touch image should be compensated for the negative pixel effect due to the ungrounded condition of the user. A weighted ratio combination greater than Wg can indicate that a grounded user is touching the panel. An image mixing factor 1.0 can correspond to that combination value, indicating that negative pixel effect is not present and that the original captured touch image should not be compensated because the user is grounded. A weighted ratio combination between Wu and Wg can indicate that a partially grounded user is touching the panel. An image mixing factor between 0.0 and 1.0 can correspond to the combination values between Wu and Wg, indicating that negative pixel effect is likely present to the extent determined by the weighted ratio combination value and that the original captured touch image should be compensated for the negative pixel effect to that extent. The image mixing factor can saturate at a value of 1.0. In this example, an image mixing factor nearer 1.0 can be indicative of little or no negative pixel effect for which touch image compensation can be omitted; whereas, an image mixing factor nearer to 0.0 can be indicative of negative pixel effect for which the touch image can be compensated.

Referring again to FIG. 8, a composite image can be calculated as follows (813).

$$I'' = mI + (1-m)I', \quad (4)$$

where I″=the composite image; I=the captured touch image; I′=the reconstructed image; and m=the image mixing factor. The composite image can more closely match the original captured touch image when there is little or no negative pixel effect as indicated by a higher image mixing factor. The composite image can more closely match the reconstructed image when there is more negative pixel effect as indicated by a lower image mixing factor. The composite image can be used in place of the captured touch image for further processing (815).

It is to be understood that a method for compensating for negative pixel effect is not limited to those illustrated in FIGS. 5 through 11, but can include other and/or additional actions and parameters capable of negative pixel compensation according to various embodiments.

It is further to be understood that the methods of FIGS. 5 through 11 are not limited to compensating for negative pixel effect, but can be used to compensate for other anomalies in touch images such as image blurring, for example, according to various embodiments.

Figure 12:
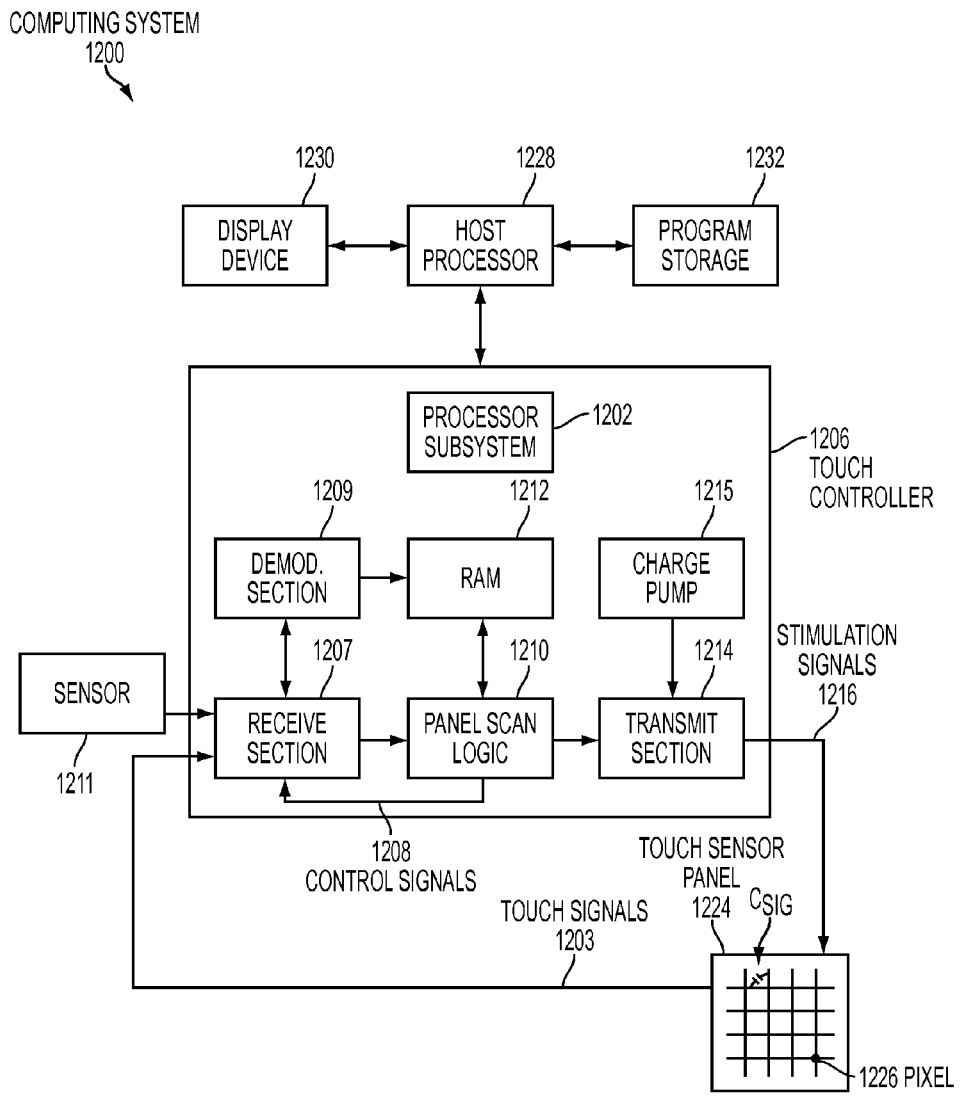
FIG. 12 illustrates an exemplary computing system that can compensate for negative pixel effect according to various embodiments.

FIG. 12 illustrates an exemplary computing system 1200 that can compensate for negative pixel effect according to various embodiments described herein. In the example of FIG. 12, computing system 1200 can include touch controller 1206. The touch controller 1206 can be a single application specific integrated circuit (ASIC) that can include one or more processor subsystems 1202, which can include one or more main processors, such as ARM968 processors or other processors with similar functionality and capabilities. However, in other embodiments, the processor functionality can be implemented instead by dedicated logic, such as a state machine. The processor subsystems 1202 can also include peripherals (not shown) such as random access memory (RAM) or other types of memory or storage, watchdog timers and the like. The touch controller 1206 can also include receive section 1207 for receiving signals, such as touch signals 1203 of one or more sense channels (not shown), other signals from other sensors such as sensor 1211, etc. The touch controller 1206 can also include demodulation section 1209 such as a multistage vector demodulation engine, panel scan logic 1210, and transmit section 1214 for transmitting stimulation signals 1216 to touch sensor panel 1224 to drive the panel. The panel scan logic 1210 can access RAM 1212, autonomously read data from the sense channels, and provide control for the sense channels. In addition, the panel scan logic 1210 can control the transmit section 1214 to generate the stimulation signals 1216 at various frequencies and phases that can be selectively applied to rows of the touch sensor panel 1224.

The touch controller 1206 can also include charge pump 1215, which can be used to generate the supply voltage for the transmit section 1214. The stimulation signals 1216 can have amplitudes higher than the maximum voltage by cascading two charge store devices, e.g., capacitors, together to form the charge pump 1215. Therefore, the stimulus voltage can be higher (e.g., 6V) than the voltage level a single capacitor can handle (e.g., 3.6V). Although FIG. 12 shows the charge pump 1215 separate from the transmit section 1214, the charge pump can be part of the transmit section.

Touch sensor panel 1224 can include a capacitive sensing medium having row traces (e.g., drive lines) and column traces (e.g., sense lines), although other sensing media and other physical configurations can also be used. The row and column traces can be formed from a substantially transparent conductive medium such as Indium Tin Oxide (ITO) or Antimony Tin Oxide (ATO), although other transparent and non-transparent materials such as copper can also be used. The traces can also be formed from thin non-transparent materials that can be substantially transparent to the human eye. In some embodiments, the row and column traces can be perpendicular to each other, although in other embodiments other non-Cartesian orientations are possible. For example, in a polar coordinate system, the sense lines can be concentric circles and the drive lines can be radially extending lines (or vice versa). It should be understood, therefore, that the terms "row" and "column" as used herein are intended to encompass not only orthogonal grids, but the intersecting or adjacent traces of other geometric configurations having first and second dimensions (e.g. the concentric and radial lines of a polar-coordinate arrangement). The rows and columns can be formed on, for example, a single side of a substantially transparent substrate separated by a substantially transparent dielectric material, on opposite sides of the substrate, on two separate substrates separated by the dielectric material, etc.

Where the traces pass above and below (intersect) or are adjacent to each other (but do not make direct electrical contact with each other), the traces can essentially form two electrodes (although more than two traces can intersect as well). Each intersection or adjacency of row and column traces can represent a capacitive sensing node and can be viewed as picture element (pixel) 1226, which can be particularly useful when the touch sensor panel 1224 is viewed as capturing an "image" of touch. (In other words, after the touch controller 1206 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between row and column electrodes can appear as a stray capacitance Cstray when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which can be a function of Csig. The signal change Qsig can also be a function of a capacitance Cbody of the finger or other object to ground, as will be described in more detail later.

Computing system 1200 can also include host processor 1228 for receiving outputs from the processor subsystems 1202 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 1228 can also perform additional functions that may not be related to panel processing, and can be coupled to program storage 1232 and display device 1230 such as an LCD display for providing a UI to a user of the device. In some embodiments, the host processor 1228 can be a separate component from the touch controller 1206, as shown. In other embodiments, the host processor 1228 can be included as part of the touch controller 1206. In still other embodiments, the functions of the host processor 1228 can be performed by the processor subsystem 1202 and/or distributed among other components of the touch controller 1206. The display device 1230 together with the touch sensor panel 1224, when located partially or entirely under the touch sensor panel or when integrated with the touch sensor panel, can form a touch sensitive device such as a touch screen.

A negative pixel effect can be determined and compensated for by the processor in subsystem 1202, the host processor 1228, dedicated logic such as a state machine, or any combination thereof according to various embodiments.

Note that one or more of the functions described above can be performed, for example, by firmware stored in memory (e.g., one of the peripherals) and executed by the processor subsystem 1202, or stored in the program storage 1232 and executed by the host processor 1228. The firmware can also be stored and/or transported within any computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the touch sensor panel is not limited to touch, as described in FIG. 12, but can be a proximity panel or any other panel according to various embodiments. In addition, the touch sensor panel described herein can be either a single-touch or a multi-touch sensor panel.

It is further to be understood that the computing system is not limited to the components and configuration of FIG. 12, but can include other and/or additional components in various configurations capable of compensating for a negative pixel effect according to various embodiments.

Figure 13:
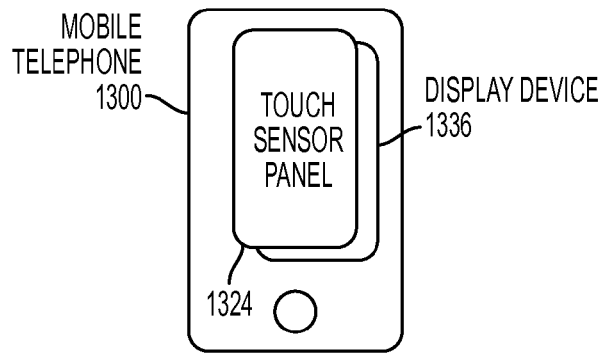
FIG. 13 illustrates an exemplary mobile telephone that can compensate for negative pixel effect according to various embodiments.

FIG. 13 illustrates an exemplary mobile telephone 1300 that can include touch sensor panel 1324, display 1336, and other computing system blocks that can compensate for negative pixel effect according to various embodiments.

Figure 14:
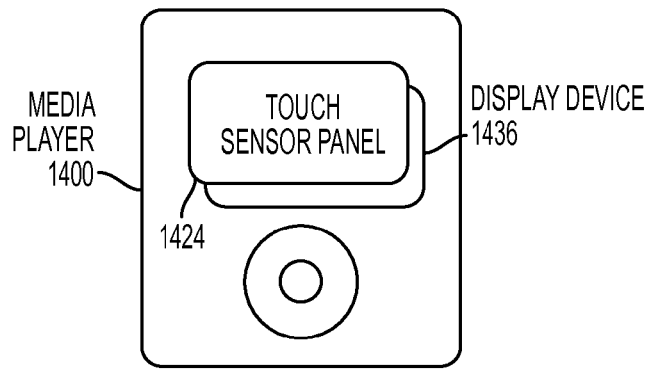
FIG. 14 illustrates an exemplary digital media player that can compensate for negative pixel effect according to various embodiments.

FIG. 14 illustrates an exemplary digital media player 1400 that can include touch sensor panel 1424, display 1436, and other computing system blocks that can compensate for negative pixel effect according to various embodiments.

Figure 15:
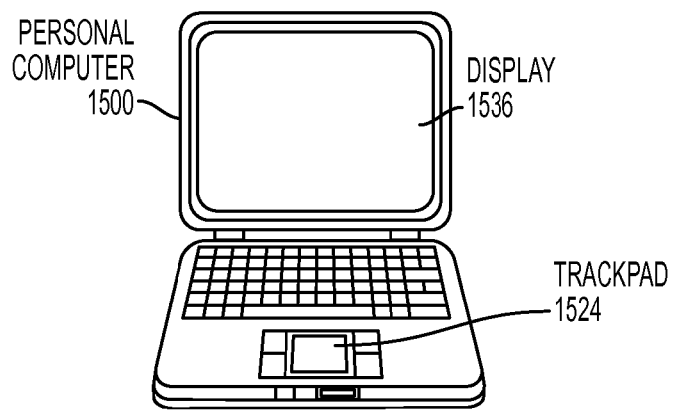
FIG. 15 illustrates an exemplary personal computer that can compensate for negative pixel effect according to various embodiments.

FIG. 15 illustrates an exemplary personal computer 1500 that can include touch sensor panel (trackpad) 1524, display 1536, and other computing system blocks that can compensate for negative pixel effect according to various embodiments.

The mobile telephone, media player, and personal computer of FIGS. 13 through 15 can realize power savings, improved accuracy, faster speed, and more robustness by compensating for a negative pixel effect according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A method comprising:
    computing at least one parameter indicative of a grounding condition of a user of a touch sensor panel;
    comparing the computed parameter to a threshold to determine whether a negative pixel effect applies to the touch sensor panel; and
    based on the comparison, compensating a touch image of the touch sensor panel for the negative pixel effect by replacing the touch image with a reconstructed touch image having the negative pixel effect substantially reduced.

2. The method of claim 1, wherein computing the parameter comprises computing an overcompensation ratio, wherein a higher overcompensation ratio indicates that the user is grounded.

3. The method of claim 1, further comprising:
    computing a second parameter if the computed parameter indicates that the user is not grounded; and
    comparing the second parameter to another threshold to determine whether the negative pixel effect applies to the touch sensor panel.

4. The method of claim 3, wherein the second parameter comprises a negative pixel ratio, a lower negative pixel ratio indicating that the user is grounded.

5. The method of claim 1, further comprising:
    determining whether more than one finger of the user is touching the touch sensor panel; and
    if not, omitting the computing, comparing, and compensating.

6. A touch sensor panel comprising:
    multiple pixels configured to generate a touch image; and
    a processor in communication with the pixels and configured to
        determine whether the touch image indicates a negative pixel effect, and
        based on the determination, compensate the touch image for the negative pixel effect by replacing the touch image with a reconstructed touch image in which the negative pixel effect is reduced.

7. The touch sensor panel of claim 6, wherein determining whether the touch image indicates the negative pixel effect comprises determining whether more than one finger is captured in the touch image.

8. The touch sensor panel of claim 7, wherein determining whether the touch image indicates the negative pixel effect comprises determining whether an overcompensation ratio indicates grounding of a user of the touch sensor panel.

9. The touch sensor panel of claim 7, wherein determining whether the touch image indicates the negative pixel effect comprises determining whether a negative pixel ratio indicates grounding of a user of the touch sensor panel.

10. The touch sensor panel of claim 6, wherein compensating the touch image comprises replacing the touch image if the negative pixel effect is determined and to keep the touch image otherwise.

* * * * *